(12) United States Patent
Eifert et al.

(10) Patent No.: US 10,293,703 B2
(45) Date of Patent: May 21, 2019

(54) METHOD FOR CONTROLLING A VOLTAGE SOURCE FOR CHARGING A BATTERY OF A MOTOR VEHICLE (71) Applicant: FORD GLOBAL TECHNOLOGIES, LLC, Dearborn, MI (US)

(72) Inventors: Mark Eifert, Hessen (DE); Eckhard Karden, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 188 days.

(21) Appl. No.: 14/919,997

(22) Filed: Oct. 22, 2015

(65) Prior Publication Data
US 2016/0121750 A1 May 5, 2016

(30) Foreign Application Priority Data
Oct. 22, 2014 (DE) .................. 10 2014 221 482

(51) Int. Cl.
| | | |
|---|---|---|
| *H02J 7/00* | (2006.01) | |
| *B60L 11/18* | (2006.01) | |
| *B60L 1/00* | (2006.01) | |
| *B60L 11/12* | (2006.01) | |
| *B60L 15/20* | (2006.01) | |

(52) U.S. Cl.
CPC ........... *B60L 11/1861* (2013.01); *B60L 1/003* (2013.01); *B60L 11/12* (2013.01); *B60L 11/1816* (2013.01); *B60L 11/1838* (2013.01); *B60L 11/1866* (2013.01); *B60L 11/1868* (2013.01); *B60L 11/1872* (2013.01); *B60L 15/2072* (2013.01); *H02J 7/007* (2013.01); *B60L 2240/545* (2013.01); *B60L 2240/547* (2013.01); *B60L 2240/549* (2013.01); *B60L 2260/20* (2013.01); *H02J 7/0073* (2013.01); *H02J 7/0075* (2013.01); *Y02T 10/645* (2013.01); *Y02T 10/7011* (2013.01); *Y02T 10/7016* (2013.01); *Y02T 10/7044* (2013.01); *Y02T 10/7061* (2013.01); *Y02T 10/7066* (2013.01); *Y02T 10/7077* (2013.01); *Y02T 10/72* (2013.01); *Y02T 10/7275* (2013.01)

(58) Field of Classification Search
CPC .................................................. B60L 11/1861
USPC .......................................... 320/116–119, 109
See application file for complete search history.

(56) References Cited

U.S. PATENT DOCUMENTS

| | | | | |
|---|---|---|---|---|
| 4,937,528 A | | 6/1990 | Palanisamy | |
| 5,166,595 A | * | 11/1992 | Leverich ................. | H02J 7/008 320/139 |
| 5,311,112 A | * | 5/1994 | Creaco ................... | H02J 7/0021 320/119 |
| 5,994,879 A | * | 11/1999 | Hsieh ..................... | H02J 7/0052 320/134 |

(Continued)

*Primary Examiner* — Zixuan Zhou
(74) *Attorney, Agent, or Firm* — Frank Lollo; Brooks Kushman P.C.

(57) ABSTRACT

A method for controlling a voltage source is used to charge a battery of a motor vehicle, wherein the desired voltage value of the voltage source is selected and controlled. The method changes between at least two charging modes at planned time intervals, wherein a first charging mode applies a different desired voltage value for charging the battery than a second charging mode. In particular, the two charging modes are a process of equalization charging the battery and a process of float charging the battery.

9 Claims, 5 Drawing Sheets

(56) References Cited

U.S. PATENT DOCUMENTS

| | | | |
|---|---|---|---|
| 6,414,465 B1 | 7/2002 | Banks et al. | |
| 7,679,328 B2 | 3/2010 | Mizuno et al. | |
| 7,990,111 B2 | 8/2011 | Mizuno et al. | |
| 2002/0171397 A1* | 11/2002 | Adrian | H01M 6/5033 320/119 |
| 2008/0156553 A1* | 7/2008 | Hoogenraad | B60K 6/48 180/65.29 |
| 2009/0140697 A1* | 6/2009 | Hurley | H02J 7/0091 320/139 |
| 2012/0112696 A1* | 5/2012 | Ikeda | B60L 11/1816 320/109 |

\* cited by examiner

METHOD FOR CONTROLLING A VOLTAGE SOURCE FOR CHARGING A BATTERY OF A MOTOR VEHICLE

CROSS-REFERENCE TO RELATED APPLICATION

This application claims foreign priority benefits under 35 U.S.C. § 119(a)-(d) to DE 10 2014 221 482.3, filed Oct. 22, 2014, which is hereby incorporated by reference in its entirety.

TECHNICAL FIELD

This disclosure relates to a method for controlling a voltage source that is used to charge a battery of a motor vehicle, wherein the desired voltage value of the voltage source is controlled. In particular, the battery is part of a low voltage current supply distribution network of the vehicle that is designed inter alia so as to charge the battery.

BACKGROUND

A low voltage current supply distribution network of a vehicle typically operates in the range of 11-16V and supplies electrical energy to consumers in the vehicle, said consumers providing different functions. These functions can be by way of example the control of the drive train and also functions relating to safety, comfort and entertainment. Furthermore, energy is to be provided for a starter battery in order to maintain said battery in a charged sate. In the case of the starter battery of a motor vehicle, said starter battery is by way of example an accumulator that supplies at least the electrical current for the starter of a combustion engine. A starter battery of this type can furthermore support the lighting operation of the vehicle and is usually charged by means of a generator such as the alternator while the vehicle is travelling. The battery of an electric vehicle that is used for driving the vehicle is described in contrast as the traction battery. In addition, electric vehicles or hybrid vehicles can also comprise a starter battery. By way of example, lead acid accumulators or lithium ion accumulators can be used as batteries, however said accumulators are also described hereinunder as lead acid batteries or lithium ion batteries.

The primary supply can be provided in a conventional vehicle by an AC generator or in a hybrid vehicle or solely electric vehicle by a DCDC converter. Since the consumers and the battery are usually connected in parallel, when selecting a desired voltage value for the primary supply, it generally involves a compromise between multiple requirements that are to be fulfilled. By way of example, low power losses can be desired which for vehicles that are driven by fuel greatly reduces the fuel consumption. On the other hand, in the case of electric vehicles and hybrid vehicles, low power losses render it possible to travel a good distance on electrical power. Furthermore, it should be possible to operate the system safely and reliably and for the battery to have a long serviceable life. In addition, the system should be robust, wherein the magnitude of the robustness can be defined as supplying electrical consumers with the required power whilst simultaneously maintaining the defined minimum voltage level.

The operating state of the vehicle can be included in the charging strategy in order to increase the serviceable life of the starter battery. The document U.S. Pat. No. 4,937,528 provides by way of example in an exemplary embodiment that a generator such as an alternator is switched on and off in dependence upon the stage of charge of the battery and the operating state of the vehicle. The generator can be isolated if the state of charge of the battery has achieved a defined value and has not yet dropped back below a lower threshold value. However, if the vehicle is in a situation where the demand for current is increased, it is possible to provide that the generator remains switched on even if the state of charge of the battery has already returned to a defined threshold value. These situations can occur by way of example at night in winter or as the air-conditioning is operating.

The previously mentioned targets that are to be achieved with regard to the construction and also how these targets are to be achieved are important in particular in an electric vehicle or a plug-in hybrid vehicle, since, although vehicles of this type are constructed with a high as possible energy efficiency, the batteries are however charged for long periods of time at an electrical socket. As a result of the loss of water, the long charging periods would lead to premature malfunctions of the battery or rather to the battery becoming damaged if the continuous charging process were to be performed at the electrical socket using a conventional charging voltage. In addition, power losses in the battery and in the vehicle consumers would accumulate in the case of a conventional charging voltage, which over time could lead to a high amount of energy being wasted.

SUMMARY

It is to be noted that the features mentioned individually in the claims can be combined with one another in any technically expedient manner and can constitute further embodiments of the invention.

A method provides to control a voltage source with which a battery of a motor vehicle is charged, wherein the desired voltage value of the voltage source is selected and controlled. In so doing, the method changes between at least two charging modes at planned time intervals, wherein a first charging mode applies a different desired voltage value for charging the battery than a second charging mode. It is preferred that a first charging mode performs a process of equalization charging the battery and a second charging mode performs a process of float charging the battery.

Consequently, the battery is charged in a planned manner at defined time intervals, wherein in particular the method switches back and forth between the equalization charging process and the float charging process. The planned charging process can be performed essentially in a time-controlled manner. During the equalization charging process, a desired voltage value is applied that facilitates the process of fully charging all cells in a lead acid accumulator. For usually temperature-dependent and frequent it is defined in such a manner that the rate at which gases develop below a maximum construction value is in the middle of the defined temperature range.

The z-curve that defines the equalization charging process can be obtained from the battery producer or can be defined by the vehicle manufacturer in order to function easily in a defined target vehicle with a predetermined usage profile. The z-curve defines the voltage at the connection terminals of the battery. In order to control the primary electrical current source so as to achieve a defined voltage at the battery connection terminals, it is necessary to provide a feedback control of the battery voltage or a strategy can be performed using a closed-loop control process with a disturbance variable feed-forward that sets the desired voltage value of the generator or DCDC convertor with regard to a total vehicle current or with regard to the battery current.

In contrast thereto, the float charging process is a control strategy for the desired voltage value of a motor vehicle current supply that minimizes the battery current and maintains the state of charge of the battery at or around a fixed value. A float charging process can be performed in one of two ways: as a temperature-dependent voltage that is defined at the battery connection terminals or as a current control strategy that controls the desired voltage value of the current supply (DCDC converter or generator) in such a manner that the battery current remains at zero. The latter method can be referred to as zero current control since it controls the desired voltage value in such a manner that the battery current is equal to zero.

As in the case of the equalization charging process, the float charging process can be achieved by means of controlling the voltage at the battery connection terminals to a temperature-dependent value by way of a feedback control of the battery voltage or by means of a closed-loop control with disturbance value feed-forward that sets the desired voltage value of the generator or DCDC convertor with regard to the total current of the vehicle or with regard to the battery current.

The strategy whereby the charging process is performed in a planned manner can be supplemented by means of prerequisites under which one charging mode is preferably performed or not performed. If according to the plan a defined charging mode is to be performed, its performance can thus be made dependent upon defined prerequisites that must prevail or rather operating limitations that may not occur. In one embodiment, it is therefore provided that for at least one charging mode at least one prerequisite is defined, and this charging mode is only activated after a defined time interval has expired if the allocated prerequisite is fulfilled.

These prerequisites can be of different types. By way of example, the prerequisite can include a defined operating state of the motor vehicle. Thus, it is possible to provide by way of example that an equalization charging process is only performed according to the plan if the vehicle is in a preferred operational mode. This can be in particular a state in which the driving torque is already available or the battery is being charged at the electrical socket.

Moreover, the prerequisite can include a minimum state of charge of the battery. By way of example, a float charging process that is to be performed according to the plan is only performed if the state of charge of the battery is sufficiently high. If, on the other hand, it is established that the state of charge of the battery is too low, a float charging process that is to be performed according to the plan can be inhibited in order to initiate directly a process of equalization charging the battery.

In addition, the prerequisite can include deactivating electrical consumers in the motor vehicle that are sensitive to a high current. Defined vehicle consumers that operate at a high current have minimum voltage requirements that by way of example exceed the typical desired voltage values during the float charging process. The prerequisite for performing a planned float charging process would then be the deactivation of the consumer. If a consumer of this category is activated when especially a float charging process is being performed, it can therefore be provided that a higher desired voltage value should be applied. If this occurs when a float charging process is planned, it is possible by way of example for a timer for the float charging process to be stopped until the consumer that operates at the high current has been deactivated and the float charging process has been restarted.

In a further embodiment, the prerequisite includes the deactivation at least of one further defined charging mode. Equalization charging processes or float charging processes are consequently only performed according to the plan if further special charging modes are not active. One example for a further special charging mode is the initial charging of the battery in which a charging voltage is applied to the battery if the motor vehicle changes into a torque-generating mode or into a mode where the charging operation is performed at the electrical socket. This function is performed in an advantageous manner in order to replace the charge that has been lost by way of example as a result of a charging process inhibit function that has been previously performed, the consumers being in a switched-off state or as a result of a saturation in the current supply during the previous operation. The initial charging function thus controls the desired voltage value of the electrical current source in such a manner that the battery is charged at the commencement of each journey or charging phase at the electrical socket. These are situations in which the vehicle changes from one mode into a torque-generating mode or into a mode where the charging operation is performed at the electrical socket.

A charging process inhibit function represents another further charging mode that must be deactivated as a prerequisite in order to perform a planned charging mode. A further charging mode of this type can inhibit a charging current from charging the battery until a defined charging process inhibit period has expired, wherein the charging process inhibit period commences if the motor vehicle is switched off after a journey. This charging process inhibit function thus controls the desired voltage value of the electrical current source in such a manner that the charging current is inhibited if the vehicle is being charged after a journey for a calibrated period of time at the electrical socket. The function is performed in an advantageous manner since the possibility exists for hydrogen to otherwise collect in a battery after said battery has been charged during a journey. The process of charging the battery can then commence only after a defined charging process inhibit period has expired. If the lead acid accumulator cannot be isolated from the current distribution network by means of a relay, it is possible to inhibit the battery current by means of controlling the current supply to a desired voltage value that is equal to or less than the no-load voltage of the battery.

The voltage source of the motor vehicle is typically an AC generator or a DCDC convertor. Furthermore, the voltage source is preferably charged by means of a low voltage current supply distribution network of a vehicle. The system is consequently essentially designed so as to control the voltage in a low voltage current supply distribution network (11-16V) of a vehicle in order thus to extend the serviceable life of the battery and to minimize the current consumption of ohmic consumers. The system has been developed specifically for vehicles that can be connected to an electrical socket, which includes plug-in hybrid vehicles and electric vehicles. However, the system can also be used in the case of fully hybrid vehicles or conventional vehicles whose batteries are charged exclusively during the journey. Furthermore, the method can also be used in aircraft or ships.

The power losses in a current supply distribution network of a vehicle are a function of the voltage across the network. Higher voltages increase the current passing through ohmic consumers and battery no-load currents. Both flows of current contribute to losses that in a vehicle having an engine increases fuel costs and in an electric vehicle reduces the travel distance. For this reason, it is possible to equate the maximization of the fuel saving or the maximization of the travel distance to minimizing the voltage of the current supply distribution network of the vehicle. Ideally, the voltage would be sufficiently low in order to stop the entire charging current in the battery but still corresponds to a sufficiently high state of charge of the battery in order to ensure that the vehicle can be started. The float charging process has a voltage level of this type since it maintains a state of charge of the battery without increasing it.

In order to achieve a long serviceable life of the battery and electrical robustness, it is however necessary to perform the charging process at a temperature-dependent minimum voltage level. The voltage should be sufficiently high in order to fully charge the battery and to reduce any sulphation in the battery. If high power consumers are activated, the voltage should also be sufficiently high in order to supply these consumers with a defined minimum voltage level. The equalization charging process constitutes a type of charging strategy that has such a high desired voltage value that it facilitates all cells in a lead acid accumulator being fully charged. Further advantages, special features and expedient further developments are disclosed and the illustration hereinunder of preferred exemplary embodiments with the aid of the drawings.

DETAILED DESCRIPTION

The strategy for controlling a voltage source for a battery comprises in one embodiment the following five basic functions but they can also be used individually or in any other combinations:
  1. Function of the planned charging process.
  2. Function of the initial charging process.
  3. Inhibit the charging process during the changeover to the electrical socket.
  4. Control consumers that are sensitive to high current or rather high voltage.
  5. Function of eliminating low states of charge of the battery.

The first function of the planned charging process switches between at least two charging modes over time-controlled intervals. The charging mode is in particular the equalization charging mode (EqCharge-Modus) and the float charging mode (Float-Modus). The time-controlled process corresponds to the time for activating the current supply if the vehicle is in a type of operation in which a drive torque can be applied to the wheels (drive torque available) or if the process of charging the traction battery and/or the starter battery at the electrical socket is active and the desired voltage value that is applied is not limited by additional operational limitations. These operational limitations can include the following prerequisites:
  Preferred vehicle operating mode (drive torque available or charging at the electrical socket).
  Condition with consumers that are sensitive to high current or rather high voltage.
  Activation of the initial charging function.
  Activation of the charging process inhibit function.

Figure 1:
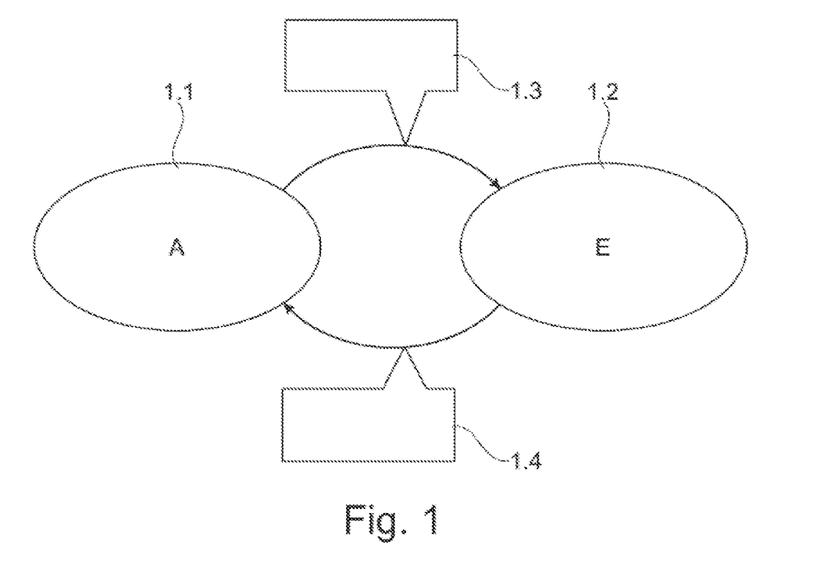
FIG. 1 illustrates a state flow chart of one embodiment having two states and a timer-controlled switching function to switch between the two states.

As is illustrated in FIG. 1, the planned charging process comprises two states and a switching function for switching between these two states, which can be controlled by means of corresponding timers. The first state 1.1 comprises as a charging mode an equalization charging process (equalization charging), while the second state 1.2 comprises as a charging mode a float charging process (float charging). The method changes from the equalization charging process to the float charging process if it is detected in step 1.3 that the timer in this mode has achieved a defined time EqCharge-Period. The method changes in turn from the float charging process to the equalization charging process if it is detected in step 1.4 that the timer in this mode has achieved a defined time period FloatPeriod.

Figure 2:
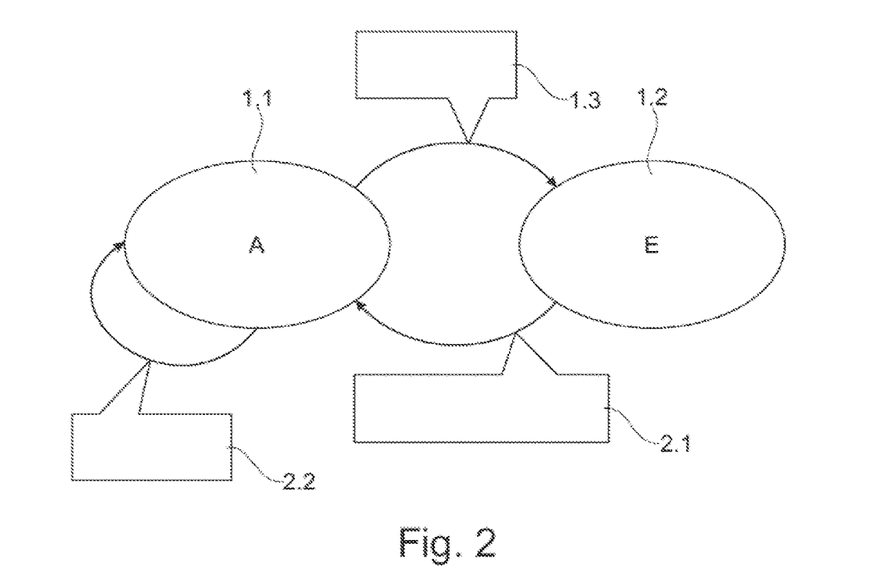
FIG. 2 illustrates a state flow chart of one embodiment including eliminating a low state of charge of the battery.

It is also possible to take into consideration the state of charge of the battery (SOC—State of Charge). FIG. 2 illustrates a state flow chart of the planned charging process with the elimination of a low state of charge of the battery. Further details of the process of eliminating a low state of charge are illustrated in combination with other charging functions in FIG. 6. If a low state of charge of the battery is detected, the strategy for the planned charging process can be reset in order to commence an equalization charging process 1.1 over the calibrated equalization charging period EqChargePeriod. If a float charging process 1.2 is actually planned when a low state of charge of the battery is established, said float charging process is prematurely interrupted and the equalization charging process 1.1 is commenced immediately. Consequently, in step 2.1, the method switches from the float charging process to the equalization charging process if a timer in the float mode has achieved a defined time FloatPeriod or a low SOC has been detected. However, if the equalization charging mode 1.1 is active when a low state of charge is detected, the equalization charging timer is reset to zero in step 2.2 in order from this point in time to apply a charging period to fully charge the battery. In step 1.3, the method then switches back from the equalization charging process to the float charging process if the timer in this mode has achieved a defined time EqChargePeriod.

The mode changes illustrated in a schematic view in FIGS. 1 and 2 are triggered by means of timers that are activated if the respective mode is active and operational limitations that would inhibit the use of the corresponding desired voltage value are not effective. Both in the case of the charging mode of the equalization charging process and also in the case of the charging mode of the float charging process, the ECM is by way of example initially activated. The ECM is an electronic control module of the vehicle (ECM—Electronic Control Module). If drive torque is available or the vehicle is ready for the charging process at the electrical socket, a check is performed as to whether the respective charging mode (equalization charging mode or float charging mode) is active. If this is the case, a check is performed as to whether operational limitations that apply to this charging mode are active. Only when this is not the case is the respective timer started.

The active charging mode is preferably defined by means of a variable that is stored in a non-volatile memory because the charging time periods will mostly exceed the duration of a journey or a charging phase at the electrical socket. Thus, the active charging mode can always be called up. An active timer is reset if a change occurs in the case of the charging mode in order to provide it for the next time if its corresponding charging mode is active. The equalization charging mode timer is reset when the method changes to the float charging mode and the float charging mode timer is reset during a new changeover back to the equalization charging mode.

The function of the planned charging process uses equalization charging processes over a time-controlled interval if no other operational limitations force a lower desired voltage value to be implemented. In the case of the equalization charging process, by way of example the following operational limitations can be used and said operational limitations can inhibit the activation of the desired voltage value for the equalization charging process:

Preferred vehicle operating mode (drive torque available or charging at the electrical socket).

Activation of the charging process inhibit function.

The equalization charging process is consequently performed in at least one preferred vehicle mode and the equalization charging process is inhibited if the vehicle is especially not being operated in this mode. If, for example, the preferred equalization charging mode is the charging process at the electrical socket, the equalization charging process is not performed outside the initial charging phase if the vehicle is being driven.

The charging process inhibit function on the other hand controls the desired voltage value of the electrical current source (AC generator or DCDC convertor) in such a manner that the charging current is inhibited if the vehicle is being charged for a calibrated period of time at the electrical socket after a journey. This function is performed since the possibility exists for hydrogen to collect in a battery after said battery has been charged during a journey. The process of charging the battery can therefore preferably commence only after a defined charging process inhibit period has expired.

The charging process inhibit function can be performed in such a manner that a time stamp is stored if the vehicle has been deactivated after a journey. This can correspond to a changeover as the key is removed. The time stamp can preferably be stored in a non-volatile memory if the electronic control device is to be fully switched off prior to the charging process at the electrical socket commencing.

If the charging process at the electrical socket commences prior to the charging process inhibit period ChargeInhibitPeriod commencing, the desired voltage value of the primary electrical current source would be controlled in such a manner that the charging current would be initially inhibited until the charging process inhibit period expires. After this period of time, the current supply control strategy can then perform the initial charging process and this can be followed by an equalization charging process or a float charging process depending upon the planned charging mode.

A charging process inhibit function of this type is illustrated with reference to the flow chart in FIG. 3. The charging process inhibit function is activated in the case of an activated ECM (3.1) if the check in step 3.2 shows that the charging process at the electrical socket is activated and the difference between the current time and time stamp that is produced if the vehicle is deactivated during the switch-off procedure is less than the calibrated charging process inhibit period (t−KeyOffTimeStamp<ChargeInhibitPeriod). The desired voltage value for the float charging process is then applied in step 3.3 and the battery current can be monitored. If the battery current $I_{Batt}$>0, in other words the battery charging current is established (3.4), the desired voltage value is reduced (3.5) by a calibrated step variable DecVoltageSP. This continues until the battery current has reduced to zero, a positive current (discharge) is measured or the time since the vehicle was switched off exceeds the charging process inhibit period.

Figure 3:
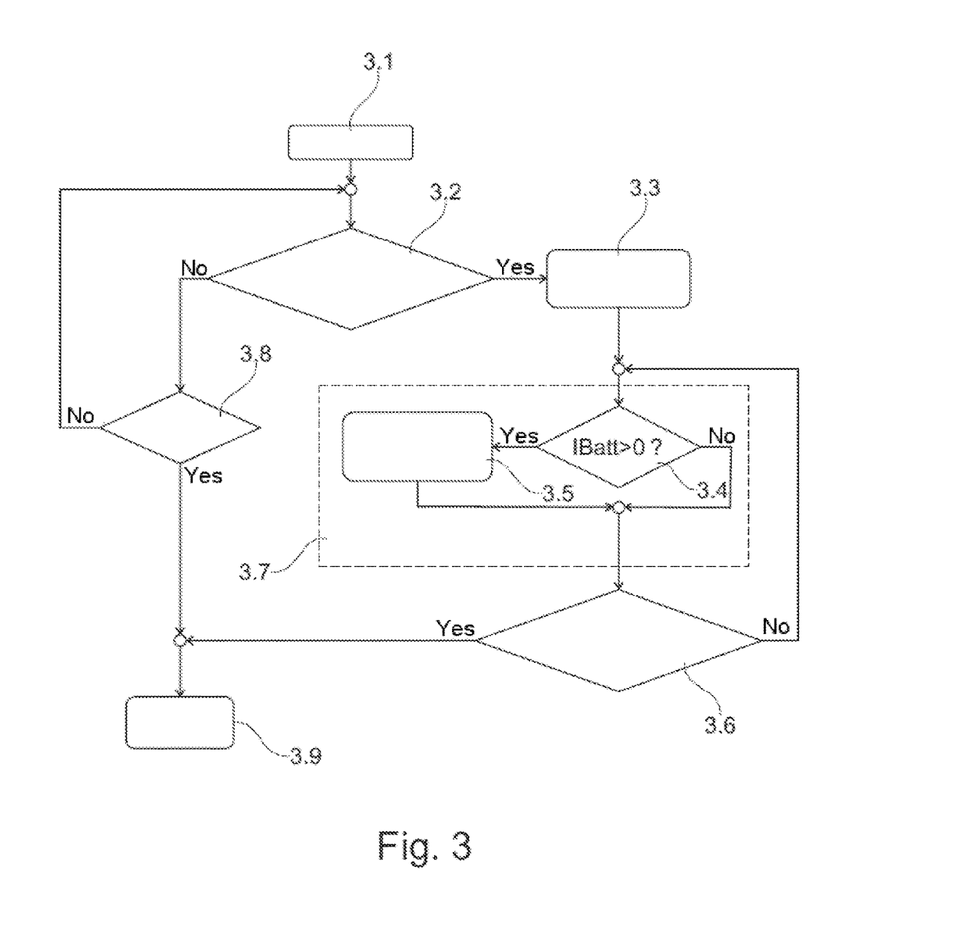
FIG. 3 illustrates a flow chart of one embodiment with a charging process inhibit function.

The part strategy 3.7 that blocks or inhibits the charging current is contained within the limits of the box illustrated in FIG. 3 by the broken line. This part strategy can be replaced by a zero current control process if the charging current can be sufficiently limited as a consequence. If the charging process inhibit strategy has been terminated because the time since the vehicle was switched off exceeds the charging process inhibit period or if the electronic control device has been activated as a result of the vehicle being switched on and the vehicle is ready to provide torque to the wheels, the initial charging function is activated. This is described hereinunder in connection with the charging mode of the float charging process.

The charging current inhibition process is consequently performed as long as the charging process is being performed at the electrical socket and the difference between the current time and the time stamp that is produced if the vehicle has been deactivated after it is switched off is not greater than the calibrated charging process inhibit period (t−KeyOffTimeStamp>ChargeInhibitPeriod) (3.6). However, if this is the case, the initial charging function is activated (step 3.9). This is also performed if a check in step 3.8 has indicated that the drive torque is available.

The function of the planned charging process uses the float charging process over a time-controlled interval if operational limitations do not force a higher desired voltage value to be applied. In the case of the float charging process, it is possible to use by way of example the following operational limitations that can inhibit the activation of the desired voltage value for the float charging process:

Condition with consumers that are sensitive to high current or rather high voltage.

Activation of the initial charging function.

The initial charging function applies a charging voltage to the battery each time the vehicle changes into a torque-generating mode or into the mode where the charging operation is performed at the electrical socket, and a voltage is applied by way of an AC generator or DCDC convertor to the battery. This function is performed in order to replace the charge that has been lost by way of example as a result of a charging process inhibit function having been previously performed, the consumers being in a switched-off state or as a result of a saturation in the current supply during the previous operation. The initial charging function consequently fills the battery at the start of each journey or charging phase at the electrical socket.

The initial charging function applies an initial charging voltage until the battery charging current drops below the calibrated threshold value InitChargeThresh. The desired voltage value for the initial charging process can be the same as for the equalization charging process. However, it can also be selected to be higher in order to minimize the time until the battery is fully charged. Since the initial charging function applies a voltage that is sufficient in order to fully charge the battery, the equalization charging process-timer can be activated during the initial charging phase if the equalization charging mode is active. Furthermore, it is advantageous if the current charging mode, which is active, is stored in a non-volatile memory so that its value is available after the vehicle has been switched off and the electronic control device has been deactivated.

Figure 4:
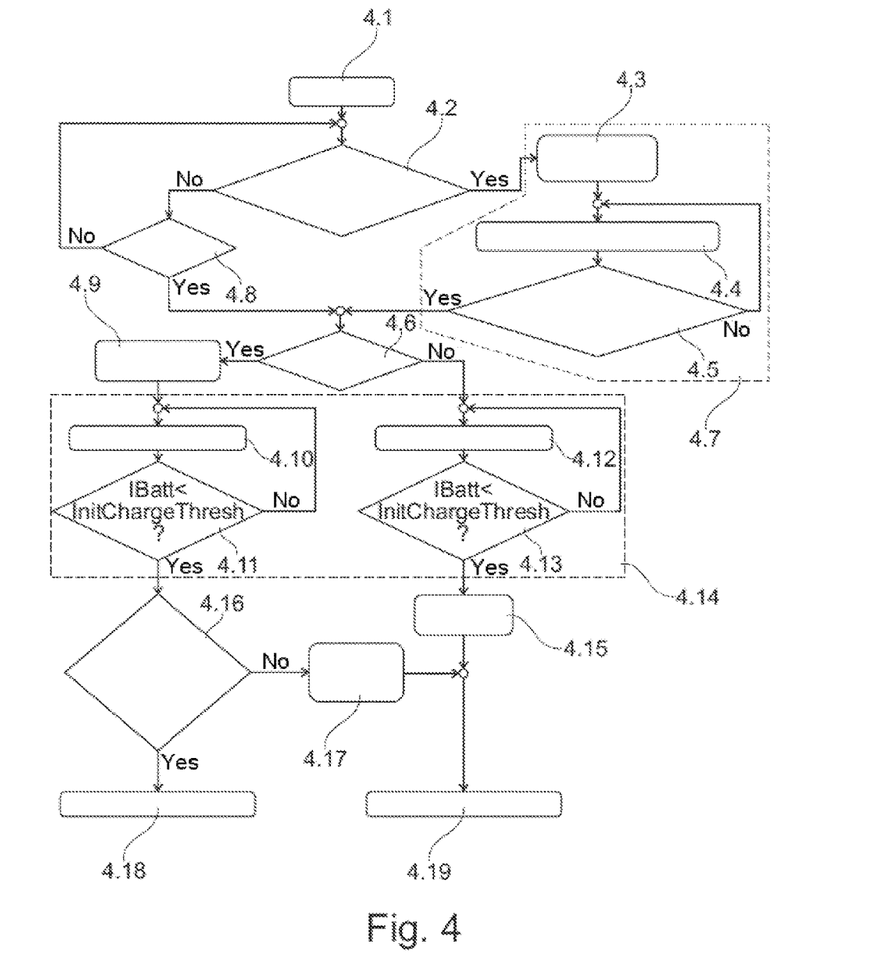
FIG. 4 illustrates a flow chart of one embodiment with the combination of a function of the initial charging process, a charging process inhibit function and the function of the planned charging process.

FIG. 4 illustrates the combination of an initial charging function of this type with a charging process inhibit function and the function of the planned charging process. After the battery charging current has dropped below the calibrated threshold value, the equalization charging process or the float charging process is activated in dependence upon the planned charging mode and possible operational limitations. In the flow chart in FIG. 4, by way of example a calibration variable VehEqChrgMode is applied, which defines the mode in which the equalization charging process is preferred. Two calibration processes in particular are possible for VehEqChrgMode: "at the electrical socket" or "drive torque available". The preferred vehicle mode for the equalization charging process constitutes an operational limitation.

If the equalization charging process is planned and the vehicle mode corresponds to the calibration process VehEqChrgMode, the equalization charging process follows on from the initial charging process and the equalization charging process-timer continues to run after the changeover to the equalization charging process. If the vehicle is at the end of the initial charging process but not in the preferred mode for the equalization charging process, the equalization charging process-timer is stopped and the float charging process commences. If the equalization charging process was not planned at the commencement of the initial charging process, the equalization charging process time is also not activated. However, if the initial charging process has ended, the float charging process-timer is activated if the initial charging process changes to the float charging process.

As is evident in FIG. 4, once the ECM (4.1) is activated in a similar manner to the sequence in FIG. 3, a check is performed in step 4.2 as to whether the vehicle is available for charging at the electrical socket and whether the difference between the current time and the time stamp that is produced if the vehicle is deactivated as it is switched off is less that the calibrated charging process inhibit period (t−KeyOffTimeStamp<ChargeInhibitPeriod). If this is not the case, a check is then performed in step 4.8 as to whether the drive torque is available. If, on the other hand, this is the case, the charging process inhibit function 4.7 commences, said function being likewise characterized in FIG. 4 by a box surrounded by a broken line. In step 4.3, the desired voltage value for the float charging process is then used and the battery current inhibit process 4.4 commenced. This process continues until the check in step 4.5 indicates that the vehicle is ready for charging at the electrical socket and the difference between the current time and the time stamp that is produced if the vehicle is deactivated as it is switched off is greater than the calibrated charging process inhibit period (t−KeyOffTimeStamp>ChargeInhibitPeriod). If this condition prevails, a check is performed in step 4.6 as to whether the equalization charging mode is active. The same thing applies if the check in step 4.8 has indicated that the drive torque is available.

If the equalization mode is active in step 4.6, the equalization charging process-timer is started (4.9) and the initial charging process commences. The initial charging process function is characterized in FIG. 4 by a box 4.14 that is surrounded by a broken line. The desired voltage value for the initial charging process is applied (4.10) until the check in step 4.11 indicates that the battery current $I_{Batt}$ is less than InitChargeThresh. If, on the other hand, the equalization charging mode is not active, the equalization charging process-timer is not started but likewise in step 4.12 the desired voltage value is applied for the initial charging process until the check in step 4.13 indicates that the battery current $I_{Batt}$ is less than InitChargeThresh.

If the check during step 4.11 indicates that the battery current $I_{Batt}$ is less than InitChargeThresh, a check is performed as to whether the vehicle is in the process of being charged and VehEqChrgMode="at the electrical socket" or the drive torque is available and VehEqChrgMode="drive torque available" (4.16). If one of these prerequisites is fulfilled, the equalization charging process is activated (4.18). If none of the prerequisites is fulfilled, the equalization charging process-timer is stopped (4.17) and the float charging process is activated (4.19). The float charging process will also be activated if the check in step 4.13 has indicated that the battery current $I_{Batt}$ is less than InitChargeThresh. Previously, the float charging process-timer is started in step 4.15.

Specific vehicle consumers that operate at a high current have minimum voltage requirements which exceed the typical desired voltage values during the float charging process. If a consumer in this category is activated when a float charging process is currently being performed, it can therefore be provided that a higher desired voltage value is applied. If this occurs when the float charging process is planned and the float charging process-timer is running, the timer can be stopped until the consumer that operates at a high current is deactivated and the flow charging process is restarted. It is possible to inform the current supply control strategy via CAN or other conventional means that the consumers that operate at a high current have been activated which requires that an equalization charging voltage be applied to the battery.

Operational limitations can also be provided for this charging function. Two examples of said operational limitations are as follows:

The control process for consumers that operate at a high current can be isolated in defined vehicle operating modes. Said defined vehicle operating modes are in this case by way of example the charging process at the electrical socket or as the vehicle is travelling in a mode in which the drive torque is available.

The control process for consumers that operate at a high current can be isolated if the battery is showing symptoms of gas development or overheating.

Figure 5:
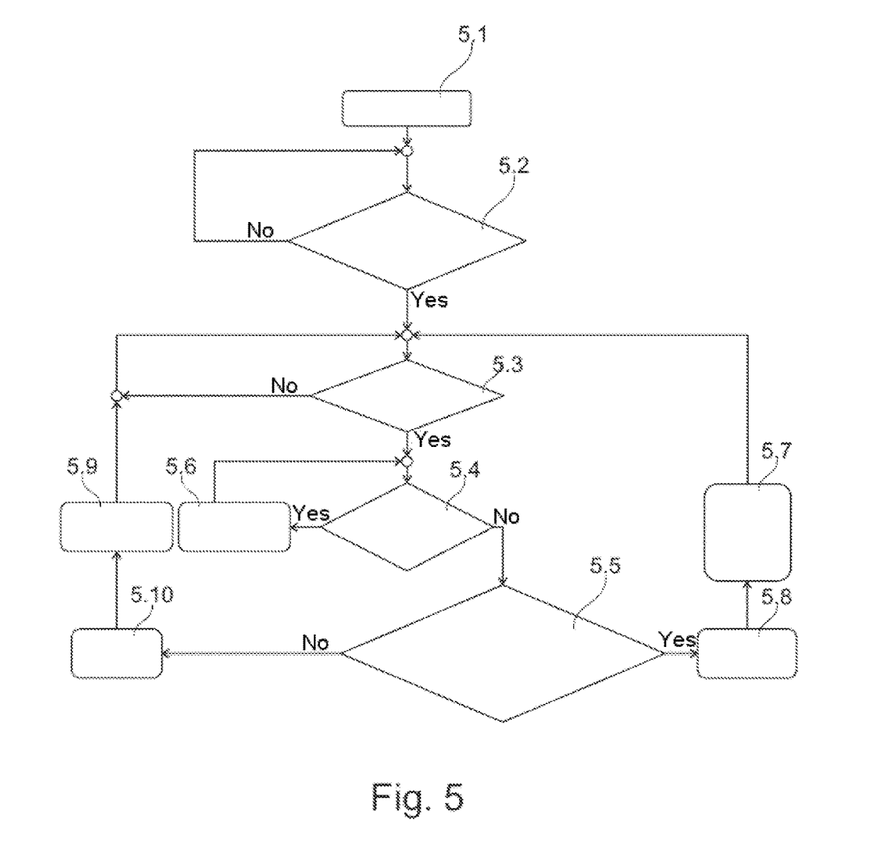
FIG. 5 illustrates a flow chart of one embodiment of the method with the combination of a function of controlling consumers that are sensitive to high current/high voltage and functions of the initial charging process and the planned charging process.

FIG. 5 illustrates an exemplary embodiment of the function of controlling consumers that are sensitive to high current or rather high voltage, said control process being combined with the functions of the initial charging process and the planned charging process. As already mentioned, both the function of the initial charging process and also the process of controlling consumers that are sensitive to high current or rather high voltage constitute operational limitations for the float charging process. If the float charging process is planned but the initial charging phase is active, the desired voltage value for the initial charging process is activated. However, if the float charging mode is planned and no operational limitations are active, the float charging process-timer is allowed to run and the float charging process-desired voltage value is applied.

If the float charging mode is planned but a voltage-sensitive consumer is activated and the voltage-sensitive consumer is not limited by the operating mode of the vehicle (charging process at the electrical socket or whilst the vehicle is travelling), the float charging process-timer is stopped and an equalization charging process-desired voltage value is applied. The vehicle operating mode(s) in which the control process for controlling the voltage-sensitive consumers is active can be selected by means of calibrating the variable HPLVehMode. It can, by way of example, assume the values "at the electrical socket" or "drive torque available" and is compared with a signal that reproduces the prevailing vehicle operating mode.

As is evident in FIG. 5, the ECM is activated (5.1) and a check is performed in step 5.2 as to whether the drive torque is available or the vehicle is ready for charging at the electrical socket. If this is the case, a check is performed in step 5.3 as to whether the float charging mode is active. If this mode is active, a check is performed in step 5.4 as to whether the initial charging phase is active. If this is the case, the desired voltage value for the initial charging process is applied (5.6). Otherwise, multiple prerequisites are checked in step 5.5. And in fact a check is performed as to whether consumers that operate at a high current are active and the vehicle is charged and the variable HPLVehMode" is "at the electrical socket" or the drive torque is available and the variable HPLVehMode is at "drive torque available". If one of these prerequisites is fulfilled, the float charging process-timer is stopped in step 5.8 and the desired voltage value for the equalization charging process is applied (5.7). If no prerequisite is fulfilled in step 5.5, the float charging process-timer is on the other hand allowed to run (5.10) and the desired voltage value for the float charging process is applied (5.9).

As already explained with reference to FIG. 2, the state of charge of the battery can also be taken into consideration when controlling the different charging functions. The state of charge of the battery can be monitored by way of example by means of a conventional potential sensor or by other means. If the state of charge drops below a threshold value that defines the minimum value with which the electrical functionality can be ensured, measures of an inhibit strategy can be initiated in order to recharge the battery.

Irrespective of whether a low state of charge is established when performing the charging process at the electrical socket or separately from the electric socket, the inhibit strategy can also include a further charging process at the electrical socket. In order to achieve this, a variable can be provided that stores the fact that a condition of a low state of charge has been established. This variable is preferably stored in a non-volatile memory in order to continue to make the information available to the current supply control strategy even after the vehicle has been switched off. The variable can be set to zero in order to indicate a safe state of charge if the inhibit strategy has applied a charging voltage to the battery during the entire equalization charging period and the measured state of charge exceeds a calibrated threshold value.

Figure 6:
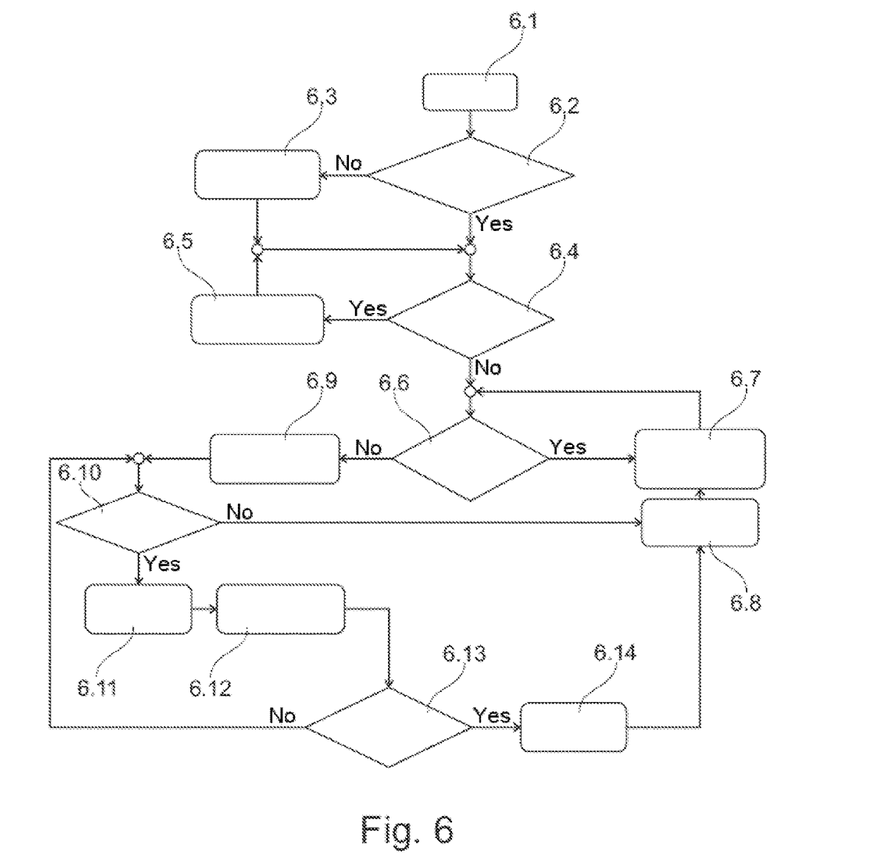
FIG. 6 illustrates a flow chart of one embodiment with the combination of a function of eliminating low states of charge and functions of the initial charging process and the planned charging process.

As already mentioned, the equalization charging process can be limited in order to only take place in preferred vehicle operating modes (e.g. at the electrical socket or when the vehicle is travelling). However, if a low state of charge has been established, the current supply control strategy can allow the equalization charging process at the electrical socket despite a calibrated preference to perform the equalization charging process separately only from the electrical socket. FIG. 6 illustrates a part of the control strategy for the operation at the electrical socket, said part relaxes the limitations by means of the vehicle operating mode if a low state of charge of the battery is established.

The control strategy illustrated in FIG. 6 performs the initial charging function and the planned charging mode follows said initial charging function, while the corresponding charging mode-timers are allowed to run. If at any point in time that differs from the initial charging phase a low state of charge is established, the equalization charging process is performed. Normally, the process of charging a plug-in hybrid vehicle or electric vehicle takes place at the electrical socket until the drive battery is fully charged. If this occurs, the charging system of the vehicle is automatically deactivated. In the case in which a low state of charge in the lead acid accumulator (SLI) is established, the charging process at the electrical socket can be further extended in that the charging system is not switched off after the drive battery is fully charged and the equalization charging process of the lead acid accumulator is continued. In this case, the inhibit strategy can be designed so as to continue the equalization charging process while the vehicle remains at the electrical socket until one of the following prerequisites is fulfilled:

The equalization charging period achieves a calibrated threshold value.

The state of charge of the battery achieves a calibrated threshold value.

FIG. 6 illustrates that, after the activation of the ECM at the electrical socket (6.1), a check is performed in step 6.2 as to whether the float charging mode is active. If this is the case, a check is performed as to whether the initial charging phase is active (6.4). If this is also the case, the desired voltage value for the initial charging process is applied (6.5). If, on the other hand, the float charging mode is not active, the equalization charging process-timer continues to run (6.3). If the check in step 6.4 indicates that the initial charging process is not active, a check is performed as to whether the state of charge of the battery is too low (6.6). If this is the case, the desired voltage value for the equalization charging process is applied (6.7) until the state of charge of the battery is no longer too low. The equalization charging process-timer is then stopped (6.9) and a check is performed in step 6.10 as to whether the float charging mode is active. If this is not the case, the equalization charging process-timer is started (6.8) and the desired voltage value for the equalization charging process is applied (6.7). If, on the other hand the float charging mode is active, the float charging process-timer continues to run (6.11) and the desired voltage value for the float charging process is applied in step 6.12 until a low state of charge of the battery is detected again (6.13). In this case, the float charging process-timer is stopped (6.14) and the steps 6.8 and 6.7 initiated for the equalization charging process.

What is claimed is:

1. A vehicle battery charge method comprising:
by a controller, switching back and forth at planned time intervals between an equalization charging mode in which a predefined desired voltage at connection terminals of a battery is achieved to charge cells of the battery and a float charging mode in which current of the battery is reduced to zero and state of charge of the battery is maintained around a fixed value via controlling a voltage.

2. The method as claimed in claim 1, wherein the controlling is by way of feedback control of the voltage.

3. The method as claimed in claim 1, wherein the controlling is by way of closed-loop control with a feed-forward disturbance value.

4. A method for controlling a voltage source of a vehicle comprising:

by a controller, switching back and forth at planned time intervals between an equalization charging mode in which a desired voltage is applied to charge cells of a battery and a float charging mode in which battery current is minimized and battery state of charge is maintained around a fixed value via controlling a voltage at connection terminals to a temperature-dependent target value.

5. The method as claimed in claim 4, wherein the voltage source is an AC generator or a DC-DC converter of the vehicle.

6. The method as claimed in claim 4, wherein the voltage source is charged by a low voltage supply distribution network of the vehicle.

7. A vehicle comprising:
a battery; and
a controller programmed to, at planned time intervals switch back and forth between operating to cause a predefined desired voltage to be present at connection terminals of the battery to charge cells of the battery and operating to reduce current of the battery to zero and maintain a state of charge of the battery around a fixed value via controlling a voltage at the connection terminals.

8. The vehicle of claim 7, wherein the controlling is by way of feedback control of the voltage.

9. The vehicle of claim 7, wherein the controlling is by way of closed-loop control with a feed-forward disturbance value.

* * * * *